(12) United States Patent
York et al.

(10) Patent No.: US 12,247,807 B2
(45) Date of Patent: *Mar. 11, 2025

(54) REFLEX SIGHT HAVING MODULAR HOOD

(71) Applicant: Sig Sauer, Inc., Newington, NH (US)

(72) Inventors: Andrew W. York, Portland, OR (US); Drew Essig, Portland, OR (US)

(73) Assignee: SIG SAUER, INC., Newington, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/376,357

(22) Filed: Oct. 3, 2023

(65) Prior Publication Data

US 2024/0027165 A1 Jan. 25, 2024

Related U.S. Application Data

(63) Continuation of application No. 17/882,450, filed on Aug. 5, 2022, now Pat. No. 11,774,217, which is a continuation of application No. 17/133,249, filed on Dec. 23, 2020, now Pat. No. 11,408,710, which is a continuation-in-part of application No. 16/749,925, filed on Jan. 22, 2020, now abandoned.

(60) Provisional application No. 62/796,022, filed on Jan. 23, 2019.

(51) Int. Cl.
 *F41G 1/30* (2006.01)
 *F41G 1/02* (2006.01)
 *F41G 1/16* (2006.01)
 *H01M 50/247* (2021.01)
(52) U.S. Cl.
 CPC .............. *F41G 1/30* (2013.01); *F41G 1/02* (2013.01); *F41G 1/16* (2013.01); *H01M 50/247* (2021.01)

(58) Field of Classification Search
 CPC ................................ F41G 1/30; G02B 23/10
 USPC ..................................................... 42/129, 143
 See application file for complete search history.

(56) References Cited

U.S. PATENT DOCUMENTS

| | | |
|---|---|---|
| 6,327,806 B1 | 12/2001 | Paige |
| 7,484,856 B1 | 2/2009 | Newhall et al. |
| 7,647,721 B1 | 1/2010 | Gaber et al. |
| 8,024,885 B1 | 9/2011 | Newhall et al. |
| 8,082,688 B2 | 12/2011 | Elpedes et al. |
| 8,186,093 B1 | 5/2012 | Chung |
| 8,296,991 B1 | 10/2012 | Chung |
| 8,443,541 B2 | 5/2013 | Elpedes et al. |
| 8,915,392 B2 | 12/2014 | Crispin et al. |
| 9,267,759 B2 | 2/2016 | Speroni |
| 9,423,212 B2 | 8/2016 | Campean |
| 9,958,234 B2 | 5/2018 | Campean |
| 10,139,197 B1 | 11/2018 | Horton et al. |
| 10,254,532 B2 | 4/2019 | Collin |

(Continued)

FOREIGN PATENT DOCUMENTS

| | | |
|---|---|---|
| CN | 204268973 U | 4/2015 |
| CN | 206019474 U | 3/2017 |

(Continued)

*Primary Examiner* — Jonathan C Weber
(74) *Attorney, Agent, or Firm* — Miller Nash LLP

(57) ABSTRACT

A target sight system includes a base portion with a gun-mounting interface allowing the sight to be firmly fastened to a shooting device. The base also includes a power supply, a target light generator, and a light-passing surface through which the target light passes between the target light generator and a target. The sight system also includes a cover that is detachably removable from the base portion.

12 Claims, 9 Drawing Sheets

(56) References Cited

U.S. PATENT DOCUMENTS

| | | |
|---|---|---|
| 10,514,233 B2 | 12/2019 | Sun et al. |
| 2006/0196099 A1 | 9/2006 | Matthews et al. |
| 2010/0175297 A1 | 7/2010 | Speroni |
| 2013/0008072 A1 | 1/2013 | Chung |
| 2013/0180152 A1 | 7/2013 | Speroni |
| 2013/0212922 A1 | 8/2013 | Thomas et al. |
| 2014/0109456 A1 | 4/2014 | Jung et al. |
| 2014/0109457 A1 | 4/2014 | Speroni |
| 2014/0237884 A1 | 8/2014 | Koesler et al. |
| 2014/0305022 A1 | 10/2014 | Chung |
| 2015/0198415 A1 | 7/2015 | Campean |
| 2016/0377377 A1 | 12/2016 | Collin |
| 2016/0377378 A1 | 12/2016 | Collin |
| 2017/0363387 A1 | 12/2017 | Sun et al. |

FOREIGN PATENT DOCUMENTS

| | | |
|---|---|---|
| CN | 206019475 U | 3/2017 |
| CN | 207570405 U | 7/2018 |
| CN | 208538935 U | 2/2019 |
| CN | 110071235 A | 7/2019 |
| GB | 2317711 A | 4/1998 |

REFLEX SIGHT HAVING MODULAR HOOD

CROSS-REFERENCE TO RELATED APPLICATIONS

This application is a continuation of U.S. patent application Ser. No. 17/882,450, entitled "REFLEX SIGHT HAVING MODULAR HOOD," filed Aug. 5, 2022, which is a continuation of U.S. patent application Ser. No. 17/133,249, entitled "BATTERY COMPARTMENT FOR SIGHTING DEVICE, filed Dec. 23, 2020, now U.S. Pat. No. 11,408,710, which is a continuation-in-part of U.S. patent application Ser. No. 16/749,925, entitled "REFLEX SIGHT HAVING MODULAR HOOD," filed Jan. 22, 2020, which is a non-provisional of and claims benefit of U.S. provisional patent application No. 62/796,022, entitled "REFLEX SIGHT HAVING MODULAR HOOD," filed Jan. 23, 2019, the disclosures of all of which are incorporated herein by reference in their entirety.

BACKGROUND

Reflex type gun sights provide a shooter a quick and easy way to sight a target compared to conventional iron sights. Reflex sights can be open-type, which typically include only a single lens, or closed type, which typically include at least two lenses enclosed by a tube. Generally, shooters may prefer an open reflex sight when targeting in low light conditions, and a closed reflex sight when in brighter conditions, although various shooters may prefer either type in various situations. It is relatively difficult, however, to change from one reflex type to the other, as changing reflex sights generally requires removing the installed sight from the gun and re-installing the other type.

Embodiments of the invention address these and other limitations of the prior art.

DETAILED DESCRIPTION

Figure 1:
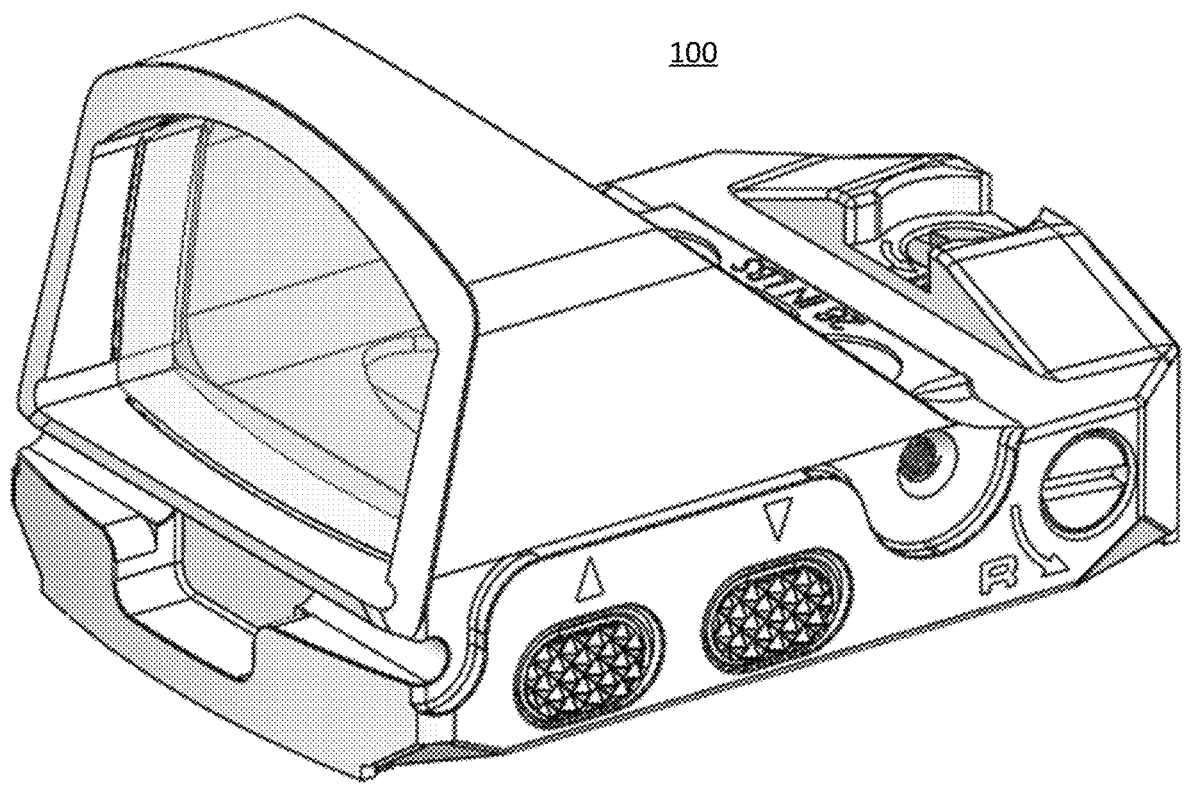
FIG. 1 is a front perspective line diagram of an open reflex sight according to embodiments.
Figure 2:
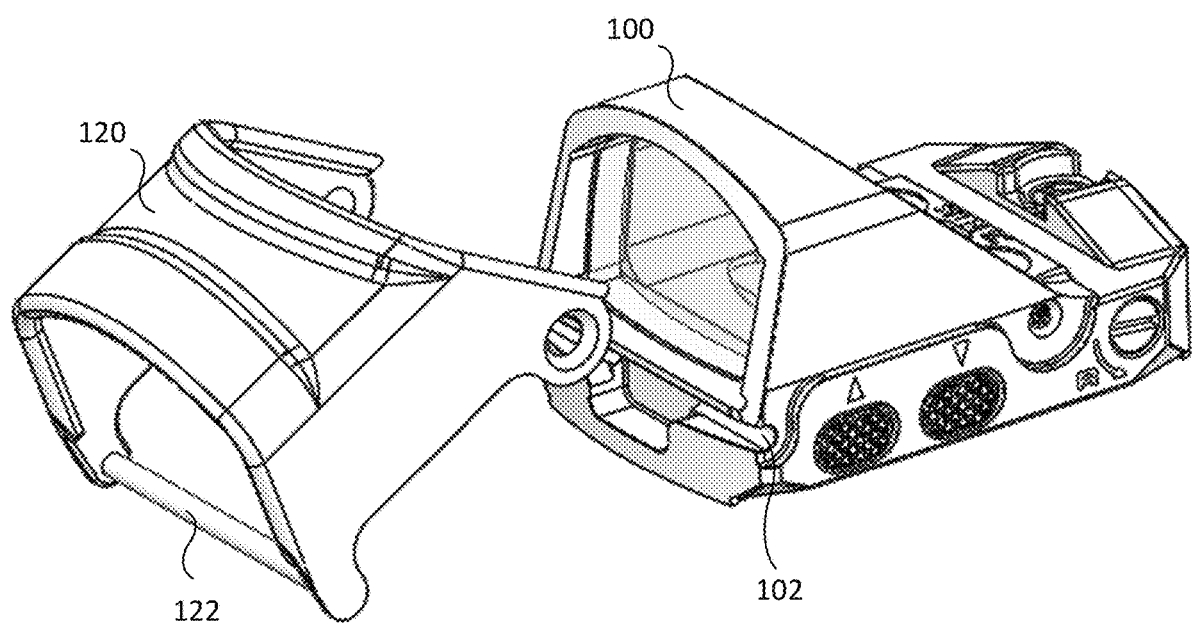
FIG. 2 is a front perspective line diagram of the open reflex sight of FIG. 1 and also illustrating a compact shroud ready to be mounted to the sight.
Figure 3:
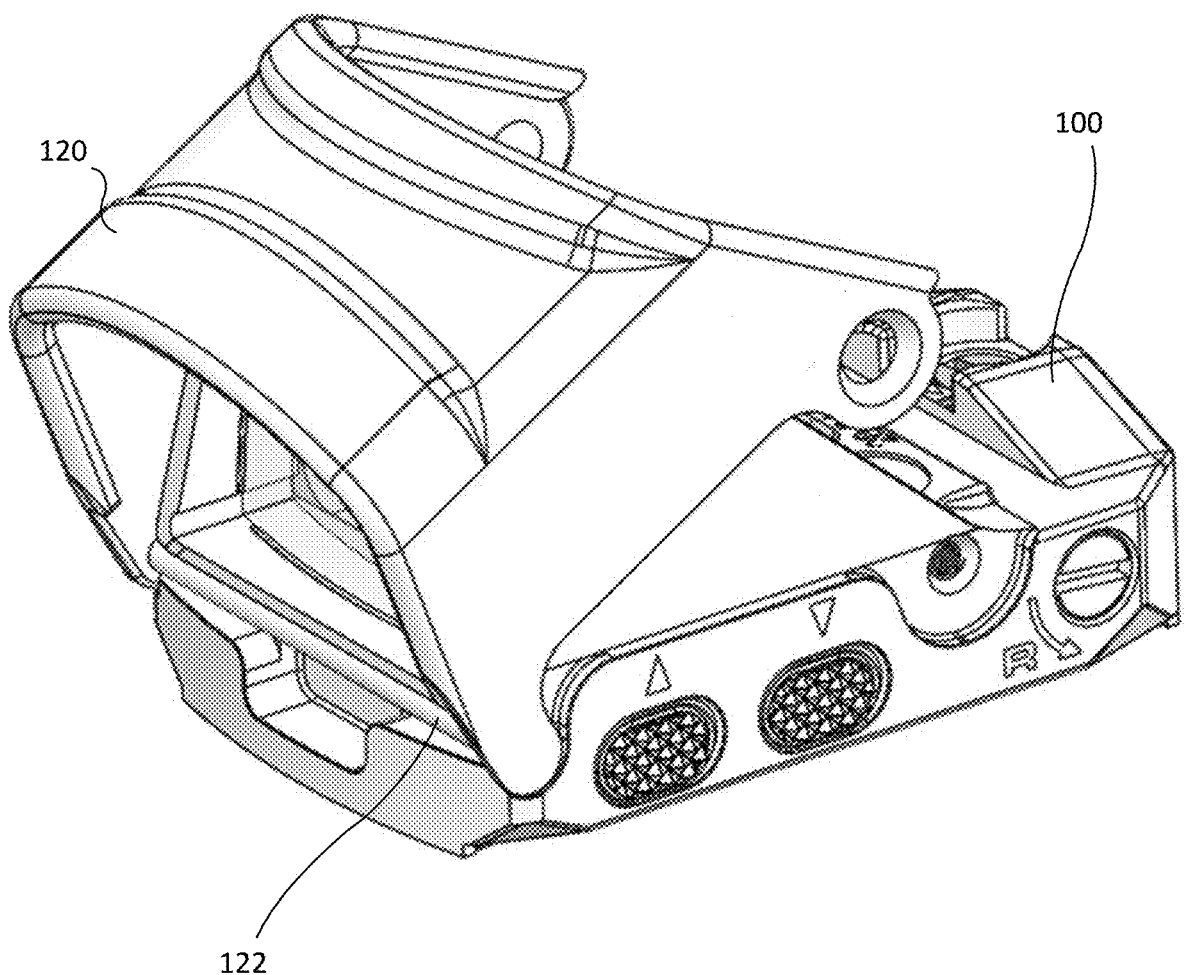
FIG. 3 is a front perspective line diagram of the open reflex sight of FIG. 1 illustrating the compact shroud of FIG. 2 in a partially mounted position.
Figure 4:
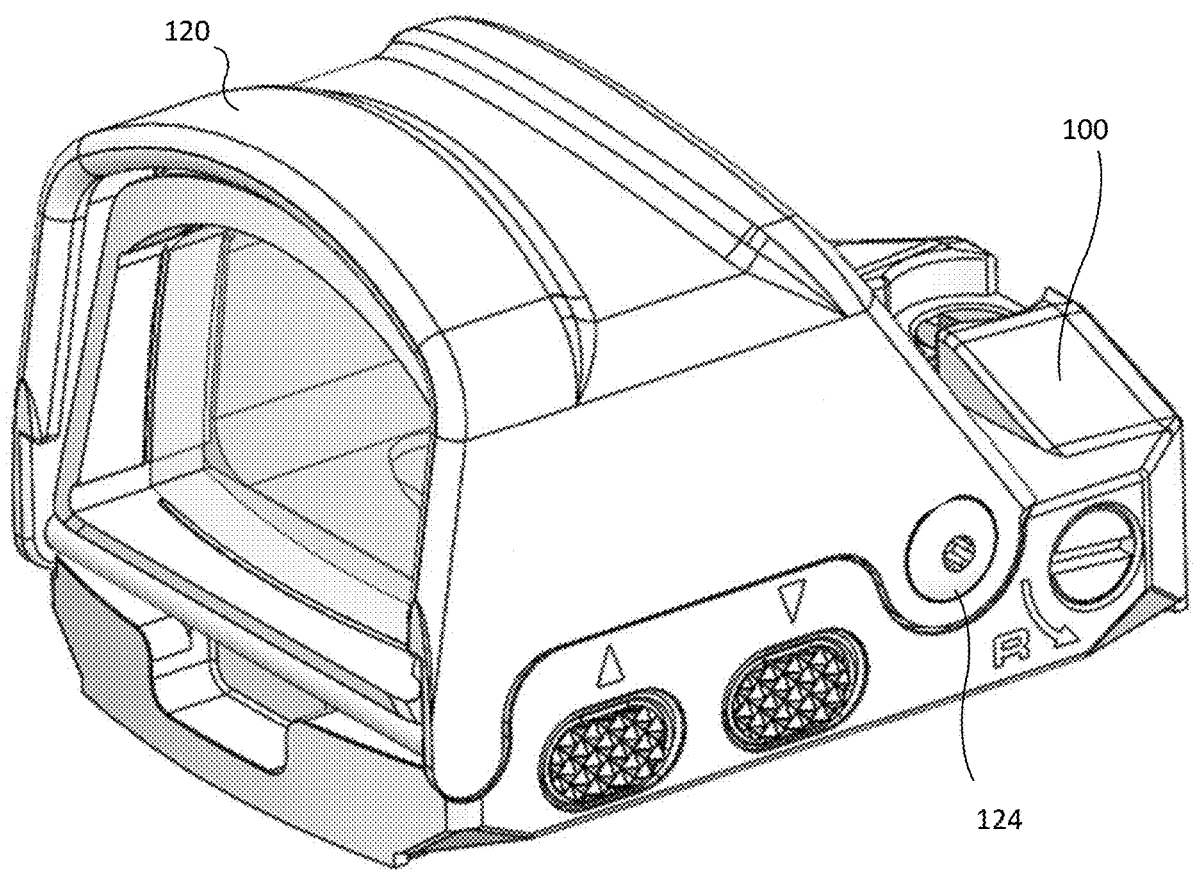
FIG. 4 is a front perspective line diagram of the open reflex sight of FIG. 1 illustrating the compact shroud of FIG. 2 in a fully mounted position.
Figure 5:
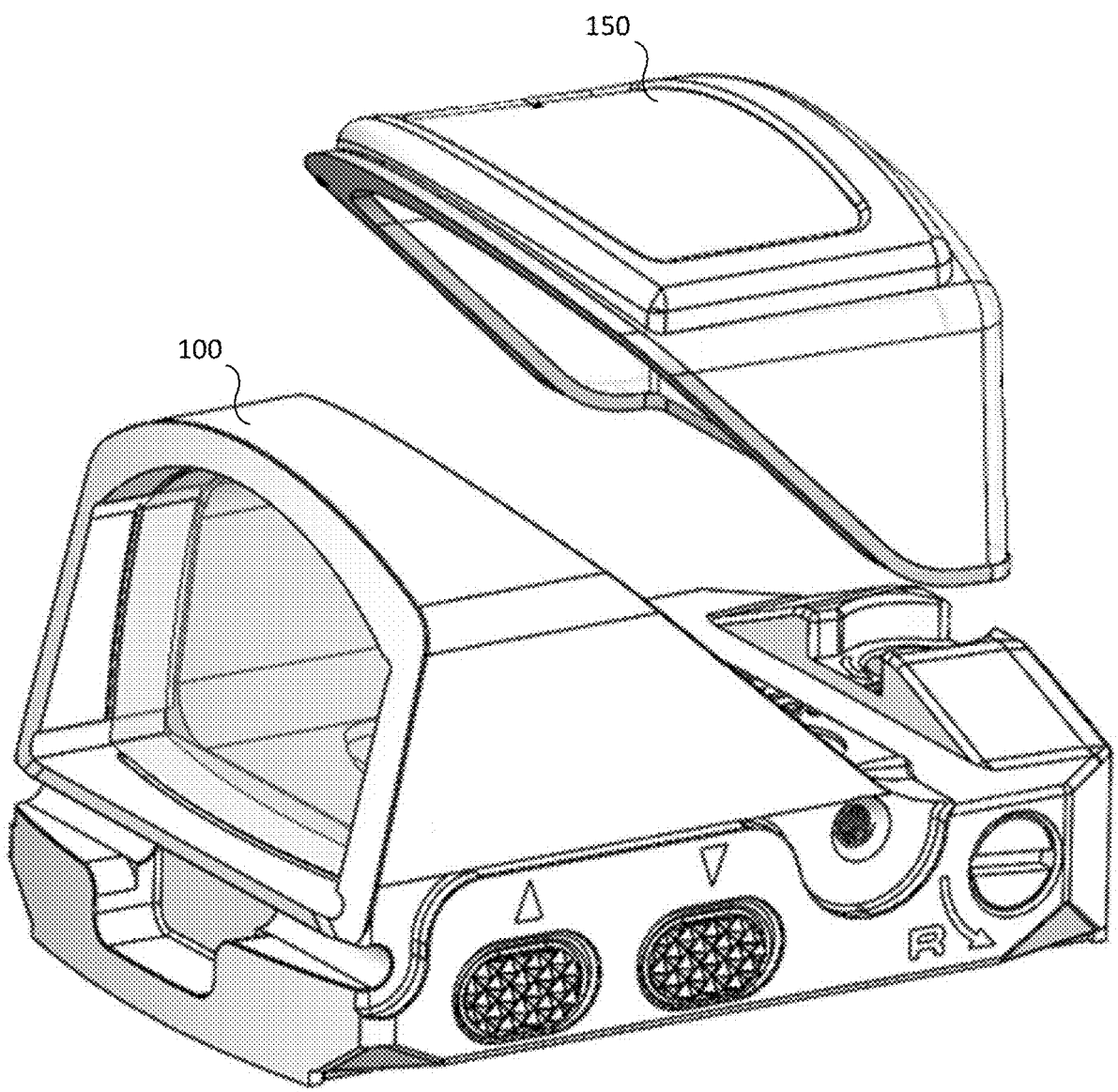
FIG. 5 is a front perspective line diagram of the open reflex sight of FIG. 1 illustrating a separate rear window that is mountable to the sight.

Embodiments of the invention may include one or more modular shrouds, which may be installed and removed by the shooter. FIG. 1 is a front perspective line diagram of an open reflex sight 100 that may accept one or more removable shrouds according to embodiments. FIG. 2 illustrates a compact shroud 120 ready to be mounted to the sight 100. The compact shroud 120 includes a bar 122 that is sized and shaped to engage with a slot or groove 102 located on a lower part of the sight 100. First, the user aligns the bar 122 with the slot 102 as illustrated in FIG. 3. Then the user rotates the free end of the compact shroud 120 toward the firearm to the closed position, as illustrated in FIG. 4. The compact shroud 120 may be then secured with one or more fasteners 124, such as a screw or pin to retain the shroud in place. In other embodiments the shroud 120 may be somewhat flexible and include one or more projections that align with one or more recesses in the sight 100 mount. As the user rotates the compact shroud 120 into position, the projections snap into place, held by the rigidity of the shroud material. Once mounted, the compact shroud 120 is in position to partially cover the reflex sight 100, providing mechanical protection as well as blocking some of the light from entering the sight.

In other embodiments the reflex sight according to embodiments of the invention include an installable rear window 150, effectively converting the open reflex sight of FIG. 1 into a closed reflex sight.

Figure 6:
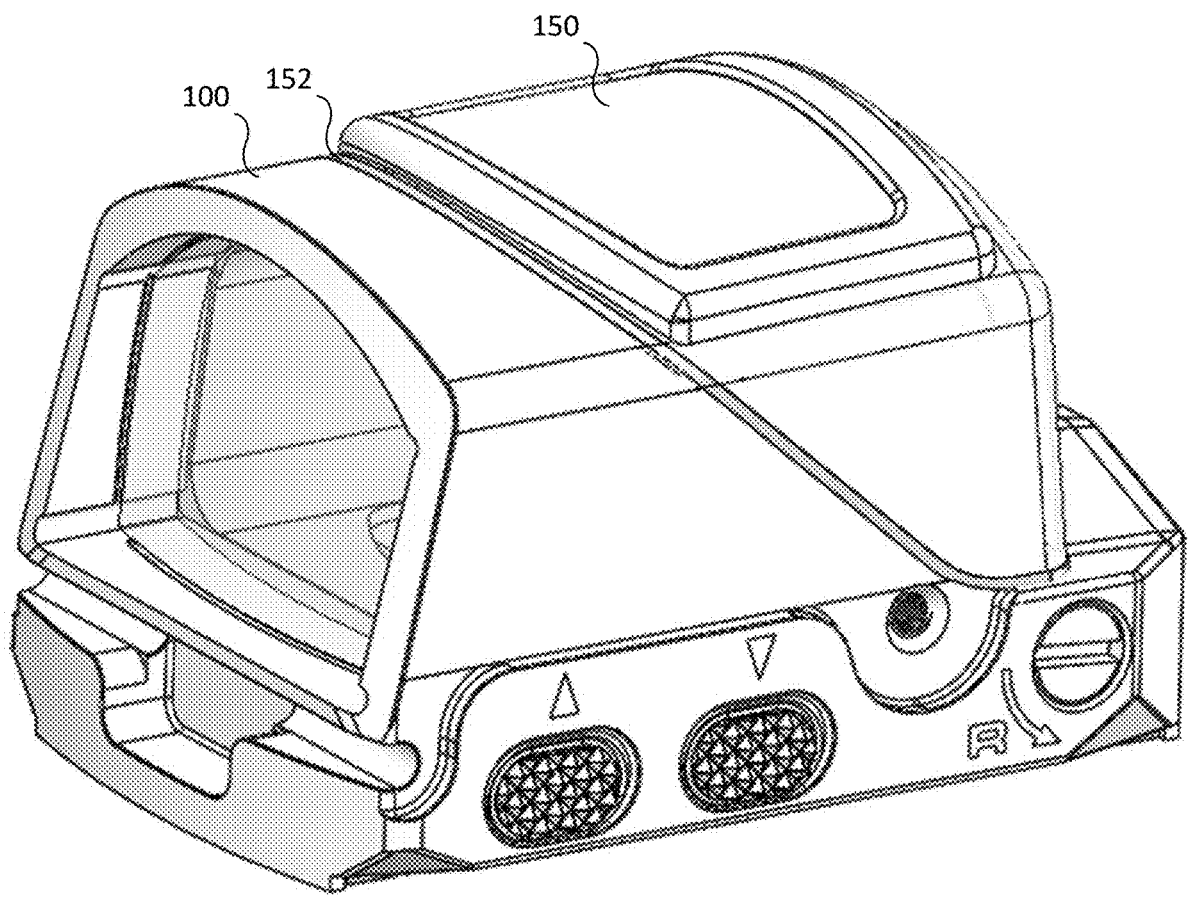
FIG. 6 is a front perspective line diagram of the open reflex sight of FIG. 1 illustrating the separate rear window of FIG. 5 in a mounted position.
Figure 7:
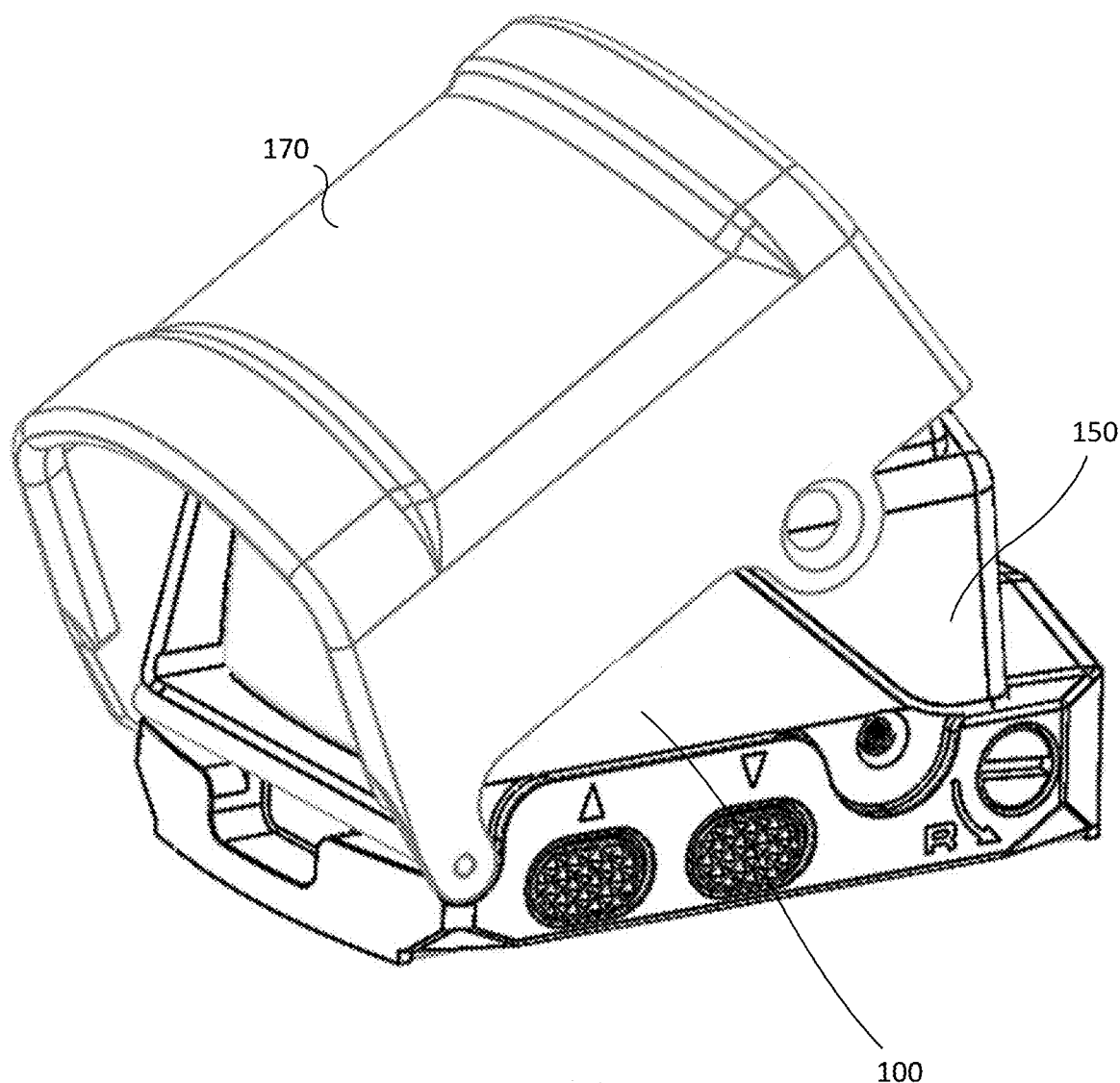
FIG. 7 is a front perspective line diagram of the open reflex sight of FIG. 6 illustrating a full sized shroud in a partially mounted position.
Figure 8:
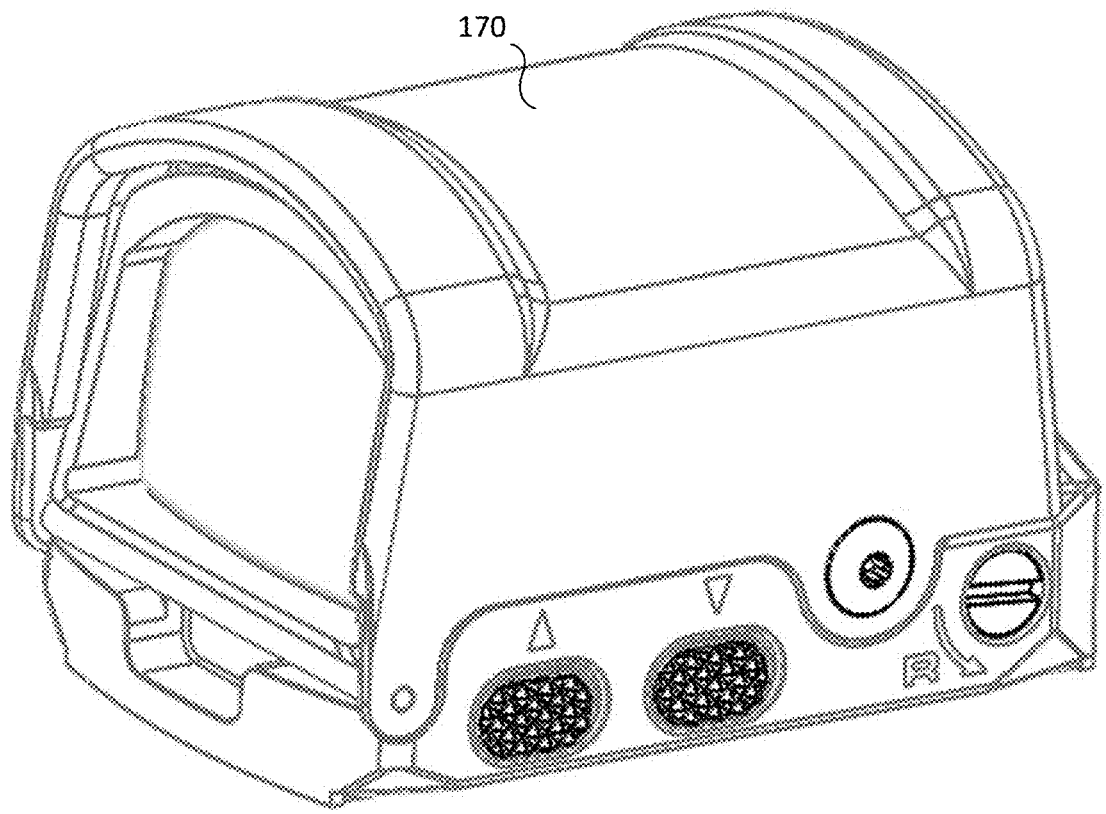
FIG. 8 is a front perspective line diagram of the open reflex sight of FIG. 6 illustrating the full sized shroud in a fully mounted position.
Figure 9:
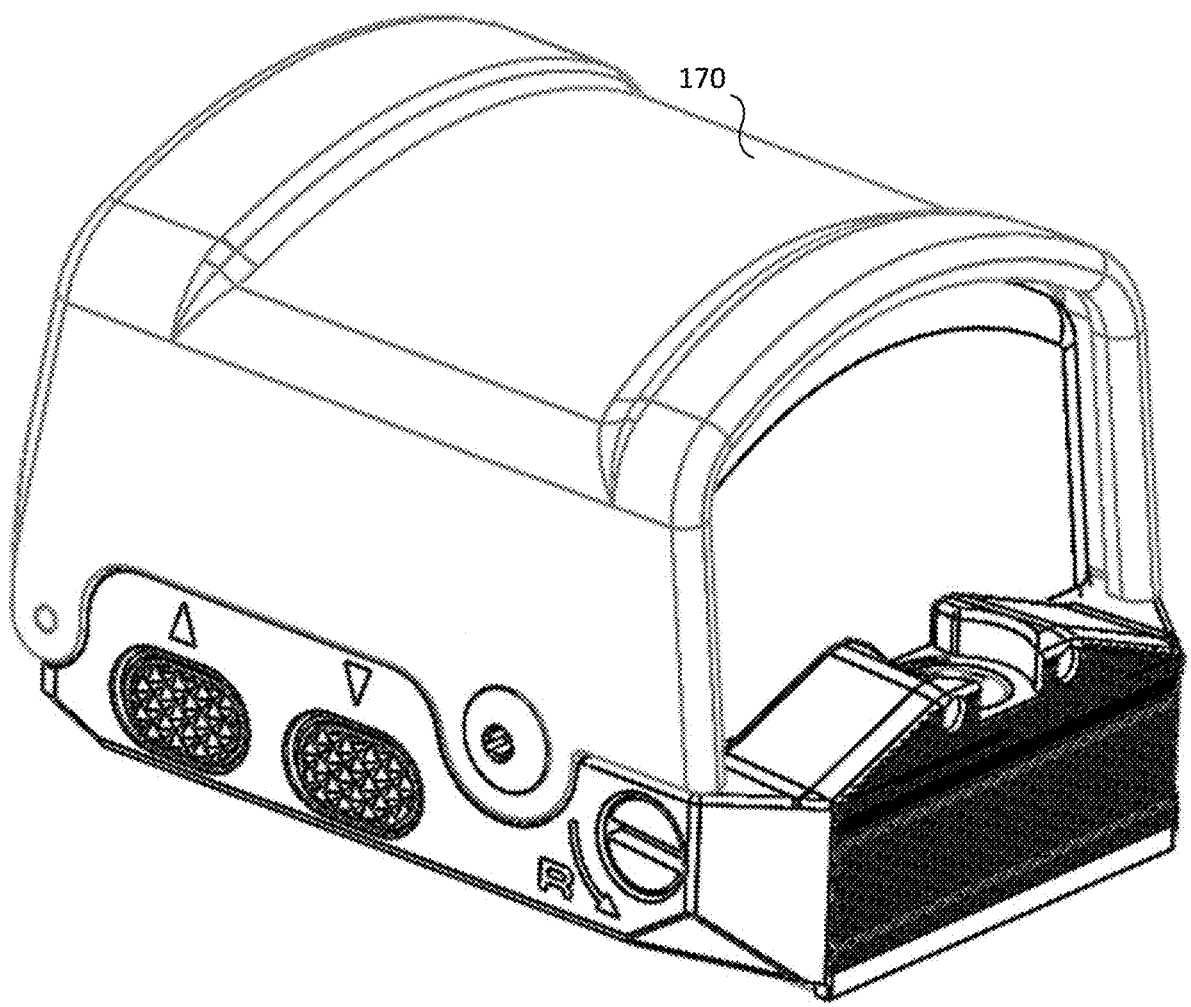
FIG. 9 is a rear perspective line diagram of the open reflex sight of FIG. 6 in which the full sized shroud is fully mounted.

FIG. 6 illustrates a separate rear window 150 that is mountable to the sight 100, that, when mounted, converts the open reflex sight of FIG. 1 into a closed reflex sight. In this embodiment the rear window 150 has an overmolded gasket 152. When installed, the gasket 152 seals the back of the open sight 100, turning it into an enclosed reflex sight. As described above, some shooters prefer closed sights to open ones. After the rear window 150 has been installed, as illustrated in FIG. 9, a full sized shroud 170 may be installed to cover the enclosed reflext sight 100, as illustrated in FIGS. 7-8. The full sized shroud 170 installs in the same manner as the compact shroud 120 described above.

This written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Although specific aspects of the disclosure have been illustrated and described for purposes of illustration, it will be understood that various modifications may be made without departing from the spirit and scope of the disclosure.

What is claimed is:

1. A reflex sight system for a firearm, comprising:
    a reflex sight structured to be mounted to the firearm, the reflex sight also including a power supply, a target sight generator, and a light-reflecting surface at which the target sight generator is directed;
    a rear window; and
    a detachably removable shroud structured to be mounted to the reflex sight, and when so mounted, covers both the reflex sight and the rear window.

2. The reflex sight system according to claim 1, in which, in a fully closed position in which the shroud covers the light-reflecting surface of the reflex sight, the shroud is fastened to a base portion of the reflex sight.

3. The reflex sight system according to claim 2, in which the shroud is fastened to the reflex sight base portion with a screw or pin.

4. The reflex sight system according to claim 2, in which the shroud is flexible and includes one or more projections, and in which the shroud is fastened to the reflex sight by a snapover connection to the reflex sight base portion, where the one or more projections of the shroud interface with one or more recesses formed in the reflex sight base portion.

5. The reflex sight system according to claim 1, in which the shroud is structured to block light from entering the reflex sight.

6. A reflex sight system for a firearm, comprising:
a reflex sight having a gun-mounting interface, the reflex sight also including a power supply, a target light generator, and a light-reflecting surface at which the target light is projected to generate a target aimpoint;
a rear window detachably removable from the reflex sight; and
a shroud detachably removable from the reflex sight and structured to cover the reflex sight and the rear window.

7. The reflex sight system according to claim 6 in which the rear window comprises a sealing gasket structured to interface with the reflex sight.

8. The reflex sight system according to claim 6 in which installing the rear window on the reflex sight converts the reflex sight system from an open reflex sight to a closed reflex sight.

9. The reflex sight system according to claim 6, in which the reflex sight includes a slot or groove in a forward portion, and in which a forward portion of the shroud includes a bar structured to engage with the slot or groove of the reflex sight and rotates relative to the reflex sight during installation.

10. The reflex sight system according to claim 9, in which, in a fully closed position in which the shroud covers the light-passing surface of the reflex sight, the shroud is fastened to the reflex sight.

11. The reflex sight system according to claim 10, in which the shroud is fastened to the reflex sight with a screw or pin.

12. The reflex sight system according to claim 10, in which the shroud is flexible and includes one or more projections, and in which the shroud is fastened to the reflex sight by a snapover connection to the reflex sight where the one or more projections of the shroud interface with one or more recesses formed in the reflex sight.

* * * * *